US011447718B2

(12) United States Patent
Alasti (10) Patent No.: US 11,447,718 B2
(45) Date of Patent: Sep. 20, 2022

(54) STRIPPING PROCESS FOR REDUCTION OF GES AND 3-MCPD ESTERS FROM EDIBLE OILS

(71) Applicant: Artisan Industries Inc., Stoughton, MA (US)

(72) Inventor: Perry Alasti, Stoughton, MA (US)

(73) Assignee: Artisan Industries Inc., Stoughton, MA (US)

(*) Notice: Subject to any disclaimer, the term of this patent is extended or adjusted under 35 U.S.C. 154(b) by 260 days.

(21) Appl. No.: 16/881,431

(22) Filed: May 22, 2020

(65) Prior Publication Data

US 2020/0377819 A1 Dec. 3, 2020

Related U.S. Application Data

(60) Provisional application No. 62/853,327, filed on May 28, 2019.

(51) Int. Cl.
| | |
|---|---|
| *C11C 1/10* | (2006.01) |
| *B01D 1/08* | (2006.01) |
| *A23L 5/20* | (2016.01) |
| *A23D 9/04* | (2006.01) |
| *B01D 1/00* | (2006.01) |
| *B01D 1/06* | (2006.01) |
| *B01D 3/10* | (2006.01) |
| *B01D 5/00* | (2006.01) |

(52) U.S. Cl.
CPC .......... *C11C 1/10* (2013.01); *A23D 9/04* (2013.01); *A23L 5/21* (2016.08); *B01D 1/0047* (2013.01); *B01D 1/065* (2013.01); *B01D 1/08* (2013.01); *B01D 3/10* (2013.01); *B01D 5/006* (2013.01); *A23V 2002/00* (2013.01)

(58) Field of Classification Search
CPC ........ B01D 1/0047; B01D 1/065; B01D 1/08; B01D 3/10; B01D 5/006; C11C 1/10; A23L 5/21; A23D 9/04; A23V 2002/00
See application file for complete search history.

(56) References Cited

U.S. PATENT DOCUMENTS

| | | | | |
|---|---|---|---|---|
| 2,126,467 A | * | 8/1938 | Hickman | ............... B01D 3/12 |
| | | | | 202/205 |
| 2,477,595 A | * | 8/1949 | Goldsbarry | ............ B01D 3/14 |
| | | | | 203/25 |
| 3,198,241 A | | 8/1965 | Baird | |
| | | (Continued) | | |

FOREIGN PATENT DOCUMENTS

| | | |
|---|---|---|
| WO | 2015/073359 | 5/2015 |
| WO | 2017/214079 | 12/2017 |
| WO | 2018/217856 | 11/2018 |

OTHER PUBLICATIONS

MacMahon, S., "Processing contaminants in edible oils: MCPD and glycidyl esters," AOCS Press, 2014, pp. 3-4.

(Continued)

*Primary Examiner* — Jonathan Miller
(74) *Attorney, Agent, or Firm* — George Jakobsche Patent Counsel PLLC (57) ABSTRACT

Methods are described for removing contaminants, including glycidyl fatty acid esters, 3-monochloropropane diol and toxins from edible oils by using short path stripping at reduced temperatures and pressures.

20 Claims, 4 Drawing Sheets (56) References Cited

U.S. PATENT DOCUMENTS

| | | | | |
|---|---|---|---|---|
| 3,393,133 | A * | 7/1968 | Baird | B01D 3/12 |
| | | | | 202/205 |
| 3,620,283 | A * | 11/1971 | Brown | B01D 1/22 |
| | | | | 159/13.2 |
| 4,599,143 | A * | 7/1986 | Stage | B01D 3/04 |
| | | | | 159/13.4 |
| 4,804,555 | A * | 2/1989 | Marschner | A23C 15/145 |
| | | | | 426/492 |
| 4,996,072 | A * | 2/1991 | Marschner | A23D 9/00 |
| | | | | 426/492 |
| 9,765,281 | B2 | 9/2017 | Bruse | |
| 10,472,589 | B1 * | 11/2019 | Alasti | C11B 3/14 |
| 2016/0298053 | A1 * | 10/2016 | Brüse | C11B 3/12 |
| 2019/0338215 | A1 * | 11/2019 | Alasti | C11B 3/006 |
| 2020/0056116 | A1 * | 2/2020 | Bruse | A23L 5/276 |
| 2021/0071103 | A1 * | 3/2021 | Maiworm | B01D 3/16 |

OTHER PUBLICATIONS

Pudell, Frank et al., "3-MCPD- and glycidyl esters can be migrated in vegetable oils by use of short path distillation: Migration of 3-MCPD and glycidyl esters by short path distillation", European Journal of Lipid Science and Technology, vol. 118, No. 3, Jun. 13, 2105; pp. 396-405.

European Patent Office, International Search Report and Written Opinion dated Jul. 22, 2020 for PCT application No. PCT/US2020/034253; 16 pp.

* cited by examiner

STRIPPING PROCESS FOR REDUCTION OF GES AND 3-MCPD ESTERS FROM EDIBLE OILS

CROSS-REFERENCE TO RELATED APPLICATIONS

This application claims the benefit of U.S. Provisional Patent Application No. 62/853,327, filed May 28, 2019, titled "Novel Stripping Process for Reduction of GEs and 3-MCPD Esters from Edible Oils," the entire contents of which are hereby incorporated by reference herein, for all purposes.

BACKGROUND

Technical Field

The present invention relates to industrial-scale food processing, and more specifically, to removing certain potential carcinogens, primarily propanol components, such as glycidyl fatty acid esters & 3-monochloropane diol (3-MCPD) fatty acid esters, from edible fats and oils by short path stripping (SPS)

Related Art

Crude oils (i.e. unrefined edible oils) typically contain free fatty acids (FFAs), phosphatides, soaps, color compounds and other environmental contaminants. Typically four processing steps are employed to refine the oil. These are typically degumming, neutralization, bleaching and deodorization. Edible oils are not suitable for human consumption until the FFAs and other contaminants are removed to produce bland oil with acceptable color, odor and taste.

Depending on the type of oil and its use, during the final refining, free fatty acids are reduced to about 2% by weight or less, and more typically to 1% or less than by weight. This is conventionally accomplished by first degassing at moderate vacuum, typically between 50 and 150 Torr at about 120° C., to eliminate moisture, oxygen and other volatiles; heating the degummed, bleached oil to stripping temperatures, typically around 250° to 270° C.; and feeding the pre-heated oil to a deodorizer. For most edible oils, such as soybean, rice oil, palm oil and other similar vegetable oils, the deodorization is not complete unless the oil is held at operating temperatures, typically about 230° C. to 270° C., for 15 to 45 minutes, with direct steam injection in a holding zone. This process is commonly referred to as "heat bleaching" to complete the deodorization to meet the taste and odor qualities expected in refined oils suitable for consumer consumption.

It has been reported that fatty acid esters of 3-chloro-1, 2-propanediol (3-MCPD) and glycidyl esters (GEs) are heat induced contaminants that are not typically present in virgin oil, but that they are formed during high temperature deodorization (Hrncirik and van Duijn, 2011; Matthaüs et al., 2011 Pudel et al., 2011). In addition, strictly from a pure chemistry standpoint, it is well known that high deodorization temperatures and long residence times, typically 15 to 45 minutes or longer, create a favorable reaction environment for formation of GEs from monoacylglyceride (MAGs) and diacylglyceride (DAGs). The works of others (Weisshaar and Perez 2010; Destaillats and others 2012) also support the premise that deodorization is the primary contributor to the formation of GEs and 3-MCPDs in refined edible oils.

Pudel and others (2011) reported that the formation of GEs during deodorization at lower temperatures, 230° C. or less, was negligible (<5 mg/kg). However, above 250° C., concentrations increased significantly with retention time. To further investigate and understand this phenomenon, Craft and others (2012) performed laboratory scale deodorization experiments with pure diacylglyceride (DAG) and confirmed significant formation of GEs at temperatures above 230° to 240° C.

It has been reported that most vegetable oils contain as much as 800 PPB of 3-MCPD esters, and as high as 500 PPB of glycidyl esters. However, refined palm oil can have as much as 4000 to 5000 PPB of these contaminants, depending on origin of the oil.

Researchers conducted deodorization experiments on unrefined palm oil using a laboratory-scale short path distillation (SPD) unit to investigate the efficacy of eliminating or significantly reducing the formation of GEs and MCPDs in the oil (Pudel & others, 2016). They discovered that refined palm oil produced at a significantly lower operating temperature of 170° C., and with short residence times, typical of SPD units, produced much lower concentrations of GEs and 3-MCPD esters in the oil. However, they pointed out that the taste and odor quality would need to be improved to meet the accepted sensory requirements for human consumption. Both GEs and 3-MCPD esters have been categorized as possible human carcinogens by the International Agency for Research on Cancer (IARC) (IARC 2000) (Grosse and others 2011).

Edible oils producers have been investigating various routes to eliminate or significantly reduce the concentrations of these potentially harmful contaminants in edible oils, particularly in palm oil, because of its abundance and relatively high content of diacylglyceride DAGs (in the range of 4% to 12%), which can lead to as much as 5000 PPB of glycidyl esters in the refined oil. The formation of GEs from DAGs during deodorization has been shown to be significant at temperatures at or above 230° C. (Hrncirik and van Duijn, 2011). Further studies by Craft, et al. (2012b) confirmed this temperature of GE formation by deodorizing refined bleached palm oil from 150°-240° C., in increments of 20° C. Additional research by a number of scientist and industry experts have concluded that the concentration of GEs in refined edible oil is dependent on the operating conditions of the deodorizers (vacuum levels, operating temperatures, residence time and rate of stripping steam). Other studies (Destaillats, et al. (2011)) showed that the critical temperature for formation of GEs from DAG is about 200° C. Above this temperature, the formation accelerates with increasing temperature.

SUMMARY OF THE EMBODIMENTS

Research and development by a number of experts in the field would suggest that the most economically feasible method for the elimination of GEs and 3-MCPD esters from refined oils would be during the final refining step (deodorization) of the oils. Typically, short path distillation (SPD), owing to its ability to operate in the micron range of vacuum, has been the preferred unit operation in the distillation of heat-sensitive, high boiling products, such as in the distillation or fractionation of fats & oils, phytosterols, emulsifiers, and the like.

It is common knowledge by people familiar with the art that, by performing distillation in the micron range of vacuum (0.001 to 0.5 Torr), the boiling point of a given compound is reduced by approximately 40° C. for each order of magnitude reduction in operating pressure. Thus operating in the micron range of vacuum allows the separation to occur at much lower temperatures, thus preserving the quality of the product, such as purity and color, and further, prevents the formation of undesirable by-products. The ability to operate in the micron range of vacuum is made possible by internally condensing the generated vapor (more volatile components), and allowing the condensed vapor (distillate fraction) to emerge from the vessel along with the product through separate connections. Yet another main design feature of SPD is the short distance between the evaporation and condensing surface, which is less than one mean free path (MFP), defined as the average distance a molecule travels in the vapor phase before colliding with another. Because such collisions can result in potential degradation of certain heat sensitive materials, such as tocopherols, and other similar high boiling, heat sensitive products, minimizing them by means of SPD can inhibit degradation.

The MFP is defined as:

$$MFP = 1/\sqrt{2} \cdot \pi \cdot N \cdot d^2$$

Where, N=number of molecules per unit volume; d=diameter of the molecules.

Artisan Industries, Inc., 44 Campanelli Parkway, Stoughton, Mass. 02072 ("Artisan") applied the same principal used in the design of conventional short path distillation (SPD) and invented Artisan short path, molecular fractional distillation, which is described in detail in U.S. Pat. No. 3,393,133 (J. L. Baird), herein incorporated by reference in its entirety, for all purposes. This device, also referred to as a short path stripper (SPS), offers a simpler, more cost effective alternative to conventional SPD units. There are two major differences between the two technologies: First, the Artisan SPS generates a falling thin-film of liquid, without moving parts, by eliminating the mechanically aided spinning rotor used in SPD units. Second, the Artisan SPS overcomes the limitation of a single-stage equilibrium device, since it can be designed with as many as five equilibrium stages, and more typically two to three stages, to enhance mass transfer for more effective distillation or stripping.

The SPD fractionating apparatus is of the cascade type. The apparatus includes an alternating series of tubular heating jackets and discs, which units are vertically and spatially separated within a column. A cooling tube passes concentrically through the alternating discs and tubular heating jackets, and an outer surface of the tube is generally parallel to and spatially separated from the inner wall of the tubular heating jacket. The inner circumference of the heated tubular jacket is less than the diameter of the disc directly below it. The upper portion of the tubular jacket has an inwardly and downwardly dished flange, the outer circumference of which is greater than the peripheral edge of the disc directly above it.

In operation, a liquid material to be distilled is cascaded over an alternating series of tubular jackets and discs yielding a continual disruption of the vertical liquid film on the internal surface of the tube jacket in the vertical fall path after relatively short vertical distances, and in which heat is supplied primarily to the continuous moving vertical relatively-thin liquid film phase. In this manner heat is conserved, hot and dry spots on the disc surface are prevented, and the ease and efficiency of handling heat-sensitive material is enhanced. The placing of the heat exchange fluid in a heat exchange relationship primarily with the thin film phase on the internal side of the tube permits the more efficient concentration and evaporation of materials. This apparatus permits the thin film phase to be continuously disrupted by a relatively cool surface, the disc, and to be continuously reformed on a relatively hot surface, the flange and the internal surface wall of the tube jacket.

The SPS incorporates a cooling means within the tubular jackets, such as a central cooling bayonet or tube, together with means to maintain any condensate collecting on this cooling unit separate from the main process stream.

In one embodiment, the current invention provides an alternative method for the reduction or elimination of environmentally present, or heat induced, contaminants, such as GEs and MCPDs, by processing the oil after the deodorization is complete. By processing the deodorized oil in the Artisan SPS, the GEs and 3-MCPDs can be significantly reduced or even eliminated at a significantly lower capital investment than conventional short path distillation. (See U.S. Pat. No. 9,765,281).

In another embodiment, the current invention provides a process of deodorizing edible oils, by using the Artisan SPS technology to prevent the formation of contaminants, such as GEs and 3-MCPDs during deodorization by operating at significantly lower temperatures (200° C. or lower), and deeper vacuum levels (0.001 to 0.5 Torr), than conventional deodorizer operating conditions. By taking advantage of multi-staged stripping and lower operating temperatures and residence times, the refined oil has acceptable taste and odor qualities, as well as significantly lower concentrations of GEs and 3-MCPDs.

Since the actual amount or concentration of these contaminants in the oil is extremely low, typically in the PPB range, minimal heat transfer surface is needed to remove or strip the contaminants. Therefore, although a conventional mechanically agitated SPD unit can perform a stripping operation (see U.S. Pat. No. 9,765,281), its excessive heat transfer area makes it unsuitable for performing a simple stripping operation where only a small amount of volatiles are being evaporated/stripped from the non-volatile product.

Below is a summary of some of the major differences between the Artisan SPS for this separation, as compared to processing the oil in a conventional SPD.

An SPD is a "single equilibrium stage" technology, whereas the Artisan SPS provides multiple equilibrium stages to achieve the acceptable residual levels of FFAs, while also meeting the sensory requirements of a particular edible oil.

Since an SPD is only a single stage device. In order to meet the residual contaminant concentrations, the product may need to be recycled, or in some cases, two or more units may need to be used in series, to simulate additional equilibrium stages. These practices are costly and inefficient, in terms of capital cost, energy consumption and processing time, in addition to exposing the product to operating temperatures longer than ideally desired, which could lead to product degradation.

SPD relies on a wiped, agitated, heat transfer surface to generate the heat duty (BTUs) required for a particular distillation. Marine oil producers have reported that when using SPD to perform stripping-only operations, such as deodorization, which require the removal of PCBs, dioxans and other environmental contaminants from fish oil to PPM levels, or more commonly PPB levels, as much as 14% of the product may be carried overhead and therefore considered a waste stream. In addition to losing valuable product, this yield loss increases waste disposal costs.

Yet another disadvantage of short path or molecular distillation is its high initial capital and installation costs, as well as relatively high maintenance costs associated with the number of moving parts, such as high speed rotor, seals and bearings, as well as the additional down time required for proper maintenance to minimize potential catastrophic losses due failure of the rotor or other moving part.

In order to address the above-described challenges of obtaining safe and palatable edible oils for human consumption, herein are described methods for removing contaminants, including glycidyl fatty acid esters (GEs), 3-monochloropropane diol (3-MCPDs), and other such toxins from edible fats and oils.

According to these methods, pre-heated, deodorized oil is pumped directly to an Artisan short path stripper (SPS), as described in U.S. Pat. No. 3,393,133. The Artisan SPS comprises an alternating series of jacketed tubes and disc sections, the interior of the jacketed tubes being fluidically connected with a bottom heat exchange fluid entry point and a bottom heat exchange fluid exit point, and an internal condenser that extends vertically through the body of the SPS.

A preferred method comprises the steps of:

(1) receiving an edible oil, pre-heated to a temperature between about 100° C. and about 200° C.;

(2) introducing the edible oil to the top of a vertical short path stripper (SPS), thereby creating a downward flowing edible oil stream in the vertical SPS; the SPS comprising an alternating series of jacketed tubes and disc sections, the jacketed tubes being fluidically connected with a bottom heat exchange fluid entry point and a bottom heat exchange fluid exit point, and an internal condenser that extends vertically through the body of the SPS;

(3) supplying heat exchange fluid at about 150° C. to about 250° C. to the jacketed tubes through the bottom heat exchange fluid entry point, thereby providing heat transfer to the jacketed tubes, and allowing the heat exchange fluid to exit from the bottom heat exchange fluid exit point;

(4) supplying condensing medium at a lower temperature than the jacketed tubes to an internal condenser that extends vertically through the body of the SPS;

(5) allowing the edible oil to fall through the alternating series of relatively warm jacketed tubes and relatively cool disc units, wherein the discs are vertically and spatially separated from the jackets, thereby creating a free falling continuous film on the internal surface of the jacketed tubes, which film is continuously refreshed by falling onto the next lower disc surface, and again reformed on a lower disc and tube surface; thereby (6) creating a heated vapor comprising contaminants, monoacylglycerides (MAGs), diacylglycerides (DAGs) and/or free fatty acids (FFAs) from the downward flowing edible oil stream;

(7) allowing the heated vapor to travel a short distance as a vapor before contacting an internal condenser;

(8) condensing the vapor onto the cooler surface of the internal condenser to form a condensate;

(9) forming a waste stream of the condensate comprising the GEs and 3-MCPDs, the toxins, FFA and/or the MAGs and DAGs;

(10) removing the waste stream by allowing the condensate to drip down as a film on the cold condensing surface, and leave the bottom of the SPS as distilled contaminants;

(11) allowing the edible oil, depleted of FFAs, GEs and/or 3-MCPDs, to exit the bottom of the SPS through a separate connection from the condensate; and (12) cooling the edible oil that exits the bottom of the SPS to preserve the oil quality;

wherein a vacuum at about 0.01 to about 0.1 Torr that is established within the SPS through a connection established near the bottom of the SPS through a vent connection provides a first driving force to separate the contaminants, MAGs, DAGs and/or any residual FFA from the downward flowing oil, and wherein the condensing medium of the internal condenser provides a second driving force to condense the contaminants, MAGs, DAGs and/or any residual FFA remaining in the edible oil.

In some embodiments of the method, the edible oil is a refined oil from a deodorizer, the refined oil having a residual concentration of free fatty acid (FFAs) that is about 1% or less by weight. In some embodiments, the residual concentration of free fatty acids is about 0.5% or less by weight. In some embodiments, the edible oil is supplied at about 140° C. to about 155° C. In some embodiments, the heat exchange fluid is supplied at about 170° C. to about 21° C.

In some embodiments, the method is used for deodorizing an edible oil while simultaneously removing undesirable contaminants, such as a GEs and MCPDs. In some embodiments, the method is used for producing a refined oil with less than about 500 PPB of the GEs. In some embodiments, the method is used for producing a refined oil with less than about 200 PPB of the GEs. In some embodiments, the method is used for producing a refined oil with less than about 500 PPB of the 3-MCPDs. In some embodiments, the method is used for producing a refined oil with less than about 200 PPB of the 3-MCPDs. In some embodiments, the method is used for producing a deodorized oil with about 0.5% by weight or less FFAs.

In some embodiments, the method is used for producing a yield of the refined oil that is about 90% or higher. In some embodiments, the method is used for producing a yield of the refined oil that is about 95% or higher. In some embodiments, the method is used for producing a refined oil with about 500 PPB or less of contaminants while operating between about 0.01 to about 0.1 Torr. In some embodiments, the method is used for producing a refined oil with about 500 PPB or less of contaminants while operating at temperatures of about 200° C. or less. In some embodiments, the method is used for producing a refined oil with about 500 PPB or less of contaminants while operating at temperatures of about 150° C. or less.

In some embodiments, the method is used to accomplish deodorization and removal of GEs in a single pass continuous operation. In some embodiments, the method is used to accomplish deodorization and removal of 3-MCPDs in a single pass continuous operation. In some embodiments, the method is used to reduce the content of MAGs and DAGs with molecular weight of about 700 by about 70% or more in the edible oil. In some embodiments, the method allows at least about 50% of the antioxidants, including tocopherols, sterols, and the like to remain in the refined oil.

In some embodiments, the SPS operates at temperatures between about 100° C. and about 250° C., or between about 150° C. and about 200° C. In other embodiments, the SPS operates at pressures between about 0.001 Torr and about 0.5 Torr, or between about 0.01 Torr and about 0.1 Torr.

In a preferred embodiment, the refined oil is introduced into the top end of the SPS, thereby creating a downward flowing edible oil stream in the vertical SPS. Heat exchange fluid, preferably a heat transfer oil, is supplied at between about 150° C. to about 250° C., more preferably between about 150° C. and about 210° C., depending on the operating pressure, to the alternating series of jacketed tubes and disc sections through a bottom heat exchange fluid entry point, thereby providing heat transfer at each disc and tube and allowing the heat exchange fluid to exit from a bottom heat exchange fluid exit point. Condensing medium is supplied at a lower temperature than the jacketed tubes to an internal condenser that extends vertically through the body of the SPS.

The refined oil is allowed to fall through the alternating series of heated tube and disc sections, wherein the discs are vertically and spatially separated from the jacketed tubes, thereby distributing a free falling continuous film on the internal surface of the jacketed tube, which film is continuously refreshed by falling onto the next lower disc surface, and again reformed on the lower jacketed tube surface, thereby creating a heated vapor comprising contaminants, monoacylglycerides (MAGs), diacylglycerides (DAGs) and/or at least any remaining residual FFA from the refined downward flowing edible oil stream.

The heated vapor is then allowed to travel a short distance as a vapor before contacting an internal condenser, whereupon the vapor condenses onto the cooler surface of the internal condenser to form a condensate, thereby causing a waste stream of condensate to form, the condensate comprising GEs and 3-MCPDs, toxins, any residual FFAs, and any remaining MAGs and DAGs. Removal of the wastestream occurs as the condensate drips down the outside of the cold condensing surface, and leaves the bottom the SPS as the distillate.

The refined oil with most FFAs, GEs and 3-MCPDs removed is allowed to exit the bottom of the SPS through a connection that is separate from that of the condensate. Finally, the refined oil exiting from the bottom of the SPS is cooled in order to preserve the oil quality.

In some embodiments, the refined oil exiting from the bottom of the SPS includes less than about 500 ppb of the GEs. In some embodiments, the refined oil exiting from the bottom of the SPS includes about 200 ppb or less of the GEs.

In some embodiments, the refined oil exiting from the bottom of the SPS includes less than about 500 ppb of the 3-MCPDs. In some embodiments, the refined oil exiting from the bottom of the SPS includes about 200 ppb or less of the 3-MCPDs.

In some embodiments, the SPS operates at between about 0.01 and about 0.1 Torr and the refined oil exiting from the bottom of the SPS includes about 500 PPB or less of contaminants. In some embodiments, the SPS operates at less than about 200° C., more preferably at less than about 150° C. and the refined oil exiting from the bottom of the SPS includes about 500 PPB or less of contaminants In some embodiments, the yield of the refined oil is about 90% or more, typically about 95% or higher.

In other embodiments, the edible oil is supplied to the SPS as described above, but prior to deodorization. In these embodiments, the edible oil is deodorized while simultaneously removing undesired contaminants, such as GEs and MCPDs. In some embodiments, the free fatty acid (FFA) content of the thus deodorized oil is preferably less than about 0.5%.

In some embodiments, the deodorization and the removal of GEs and/or 3-MCPDs are accomplished in a single pass continuous operation.

In some embodiments, the content of MAGs and DAGs with molecular weight of less than about 700 is reduced by about 70% or more in the refined oil exiting from the bottom of the SPS.

In some embodiments, a portion of the antioxidants, including tocopherols, sterols, and the like, remain in the refined oil exiting from the bottom of the SPS.

The embodiments of the invention described above are intended to be merely exemplary. Variations and modifications will be apparent to those skilled in the art. All such variations and modifications are intended to be within the scope of the present invention as defined in any appended claims.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
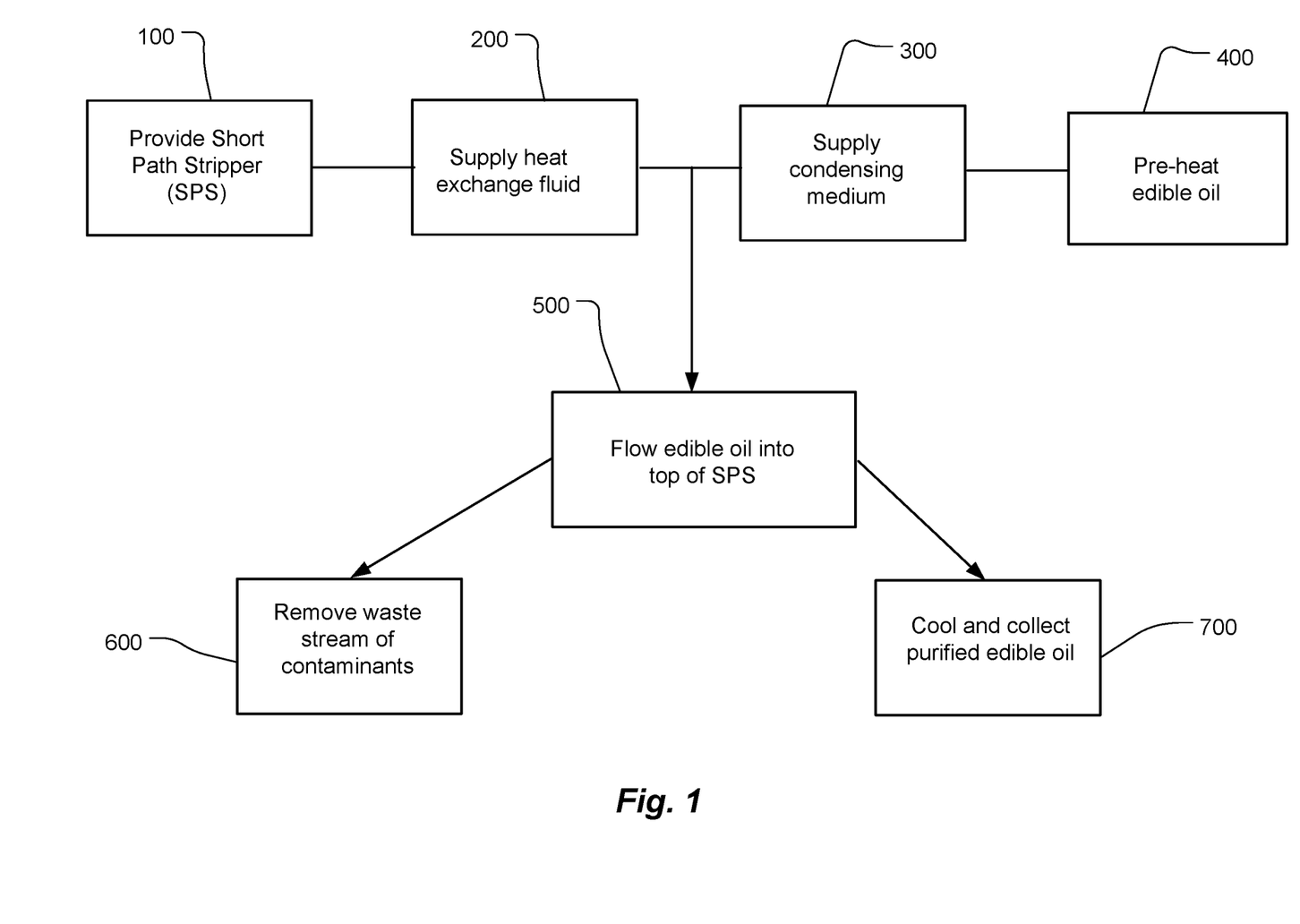
FIG. 1 contains a schematic flow diagram of a method for removing contaminants from edible fats and oils, according to an embodiment of the present invention.

FIG. 1 provides an embodiment of the SPS method of stripping contaminants from edible oil. A short path stripper is provided 100. Heat exchange fluid is provided to the stripper at a temperature of about 150° C. to about 250° C. 200. Condensing medium is supplied at a temperature lower than that of the heat exchange fluid 300. Edible oil is pre-heated 400 and flowed into the top of the SPS 500. Contaminants are removed in a contaminant stream 600 and purified edible oil is cooled and collected form a purified oil stream 700.

Figure 2:
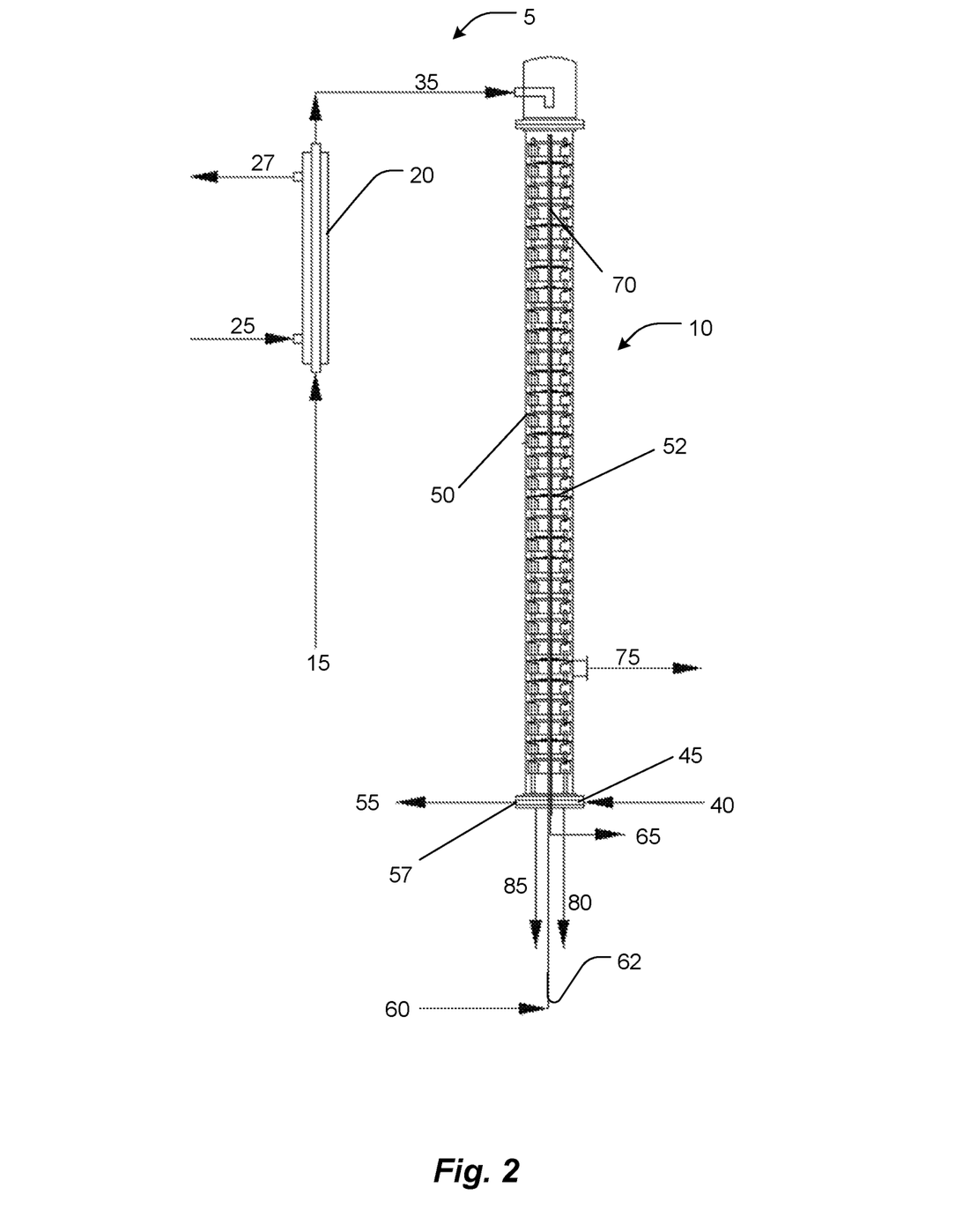
FIG. 2 shows an embodiment of an Artisan short path stripper system used in performing the method of FIG. 1.

FIG. 2 provides a diagram of the SPS system 10. Referring to this diagram, the method of the current invention begins with an edible oil 15 containing contaminants including GEs, FFAs and/or 3-MPDs being pre-heated in a Pre-Heater 20. Heat exchange fluid enters 25 and exits 27 the pre-heater 20 as indicated by the arrows, thereby heating the edible oil 15 to a temperature of between about 120° C. and about 200° C. as it flows through the pre-heater 20. In a preferred embodiment, the entering heat exchange fluid 25 comprises a commercially available heat transfer oil. After heating in the pre-heater 20, the pre-heated edible oil 35 then enters at the top of the vertical SPS 40, thereby creating a downward flowing edible oil stream.

Within the SPS, heat exchange fluid 40 in the form of heat transfer oil is supplied through a bottom heat exchange fluid entry point 45 at between about 150° C. and about 250° C. to a series of jacketed tubes 50. Upon flowing through the jacketed tubes 50, the hot oil exits 55 through a bottom heat exchange fluid exit point 57 at between 5 to 10° C. cooler than the inlet temperature to provide the heat of vaporization for the removal of the contaminants.

Condensing medium 60 is supplied through a condensing medium supply point 62 at the bottom of the SPS 5 at a temperature considerably lower than that of the jacketed tubes 50 to an internal condenser 70 that extends vertically through the body of the SPS 5.

At least a partial vacuum is drawn from the SPS 5 through a vacuum vent connection 75 near the bottom of the SPS, to reduce the operating pressure inside the SPS to between about 0.01 Torr and about 0.1 Torr.

The downward flowing edible oil stream is allowed to fall through the alternating series of relatively warm jacketed tubes 50 and relatively cool disc units 52, wherein the discs units 52 are vertically and spatially separated from the jacketed tubes 50, thereby creating a free falling continuous film on the external surfaces of the jacketed tubes 50, which film is continuously reformed by falling onto the next lower disc unit 52 surface, and again reformed on a lower jacketed tube 50 surface. The jacketed tubes 50 are heated internally by heat exchange fluid 40, thereby providing heat to the thin film liquid. The disc units 52, not being in direct thermal contact with the heat exchange fluid, are cooler than the jacketed tubes 50, so that when the film falls to the next lower disc surface, it is cooled. As it continues downward onto the next lower tube surface it is again warmed.

In this manner, a heated vapor is generated from the downward flowing edible oil stream of contaminants, monoacylglycerides (MAGs) and/or diacylglycerides (DAGs) and at least any remaining residual FFA. The generated vapor travels a short distance before contacting the internal condenser 70, whereupon the vapor cools and condenses onto the cooler surface of the internal condenser 70 to form a condensate, thereby forming a waste stream of the condensate 85 that includes the GEs, the 3-MCPDs, any residual FFA, the MAGs and/or the DAGs.

The waste stream 85 is removed by allowing the condensate to drip down as a film on the outside of the cold condensing surface, and leave the bottom of the SPS as the condensate, which is considered a waste stream 85.

The refined edible oil 80, with FFAs, GEs, 3-MCPDs, MAGs and/or DAGs removed, exits the bottom of the SPS through a separate connection from the condensate, and subsequently is cooled to preserve oil quality.

According to the described method, the driving force to separate the contaminants, MAGs, DAGs and/or any residual FFA from the downward flowing oil is provided by the combination of heated jacketed tubes 50 and deep vacuum 75 established within the SPS 5, thereby generating a small vapor fraction comprising the contaminants, MAGs, DAGs and/or any residual FFA from the downward flowing oil. The vapor fraction is condensed on the outside surface of the internal condenser, cooled by the condensing medium 60 provided to the internal condenser.

The embodiments of the invention described above are intended to be merely exemplary. Variations and modifications will be apparent to those skilled in the art. All such variations and modifications are intended to be within the scope of the present invention as defined in any appended claims. As used herein, unless otherwise indicated, "about" means±20%.

EXAMPLE

Figure 3:
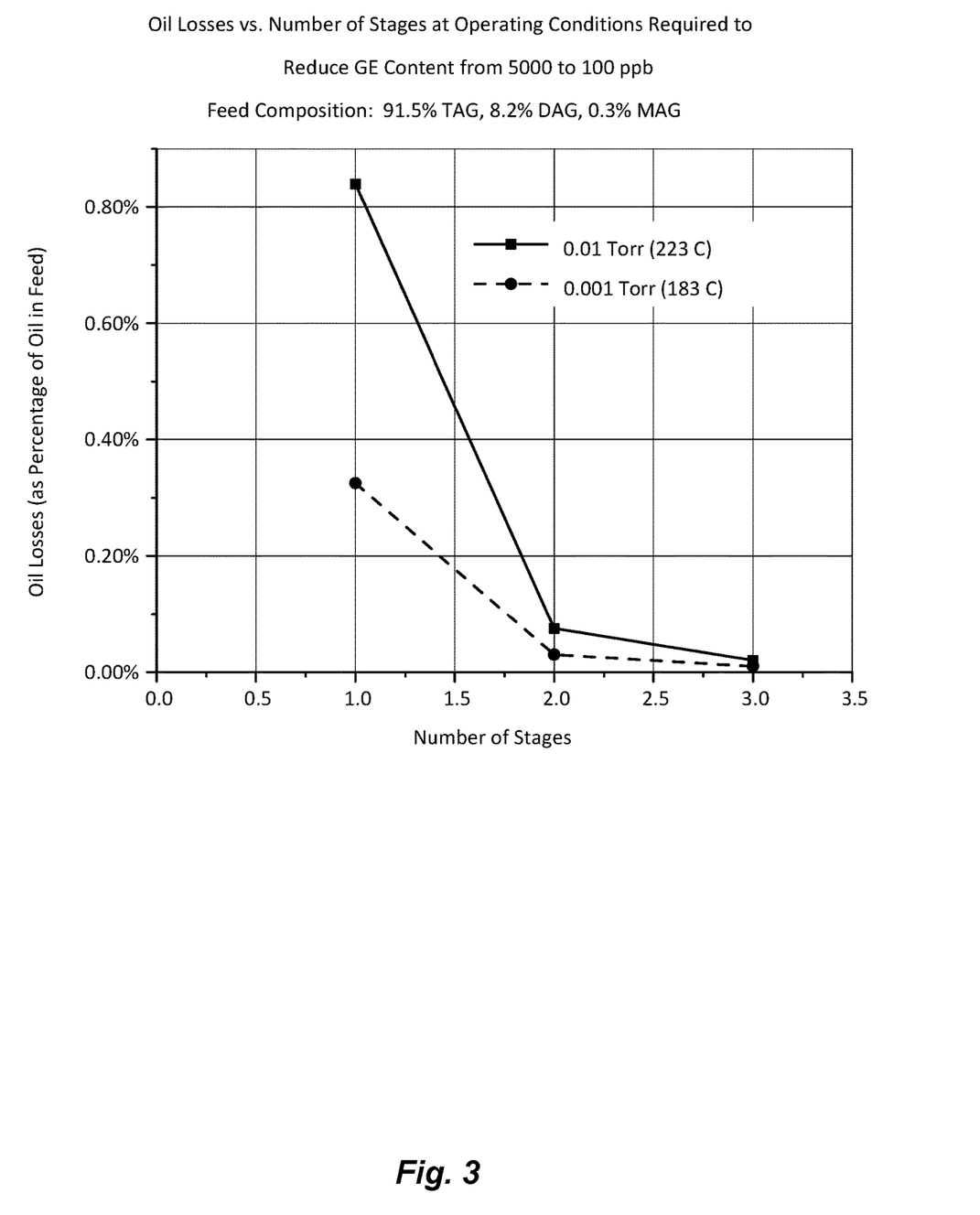
FIG. 3 shows results of a computer simulation comparing overhead losses in a conventional single-stage short path evaporator, versus the Artisan short path stripper under operating conditions that to reduce GE content from 5000 to 100 ppb, according to the method of FIG. 1.
Figure 4:
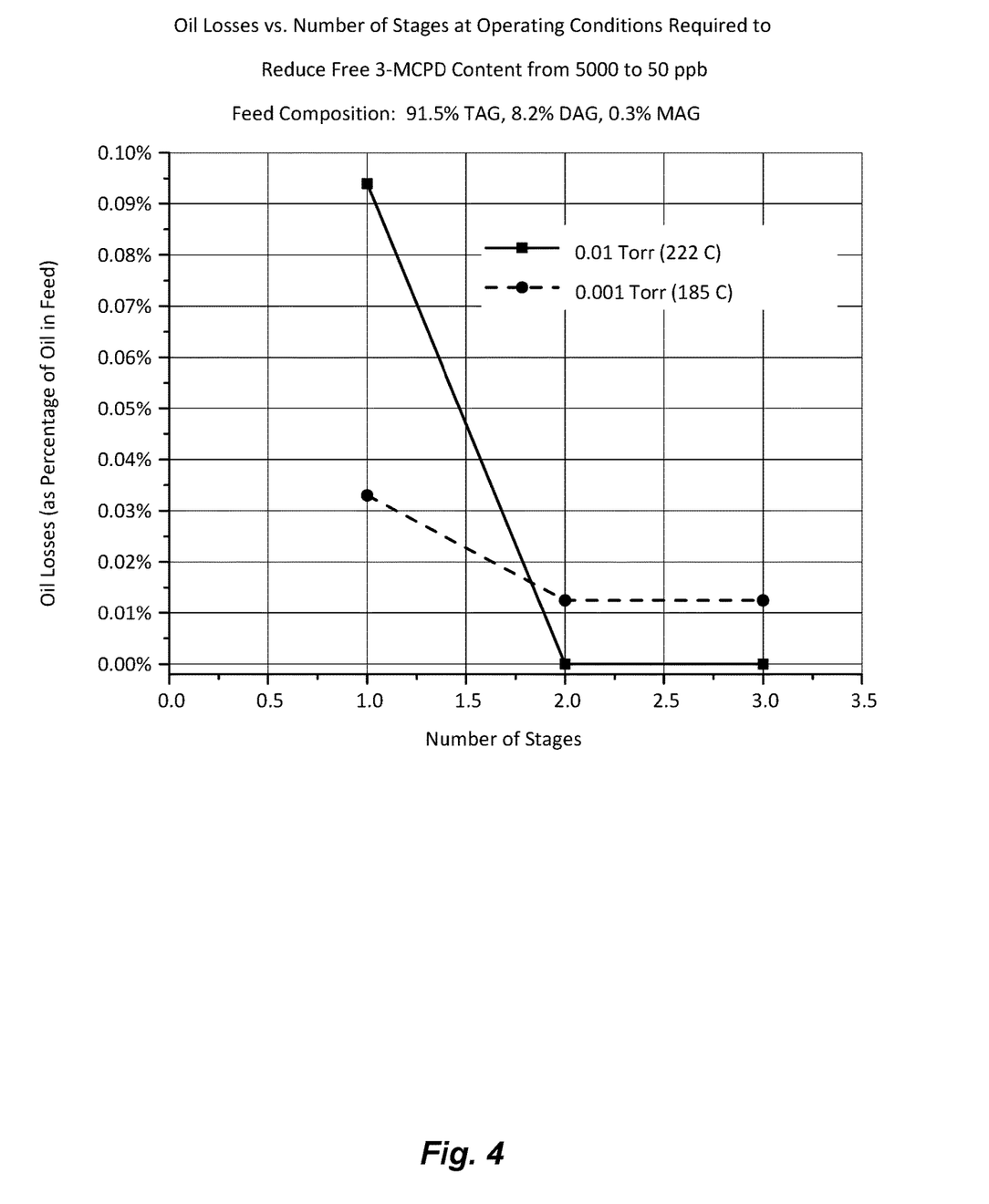
FIG. 4 shows results of a computer simulation comparing overhead losses in a conventional single-stage short path evaporator, versus the Artisan short path stripper under operating conditions that to reduce the free 3-MCPD content from 5000 to 50 ppb, according to the method of FIG. 1.

Computer simulations were performed using ChemCad to evaluate the benefits of using multi-stage short path stripping versus a conventional short path evaporator to remove glycidyl esters and free 3-MCPD from palm oil. Note that conventional short path evaporators can only provide a single equilibrium stage, while the multi-staged short path stripping can provide two, three or more separation stages. The feed stream composition was specified as 91.5 wt % triacylglyceride (TAG), 8.2 wt % diacylglyceride (DAG), 0.3% monoacylglyceride (MAG), 5000 ppb glycidyl ester and 5000 ppb free 3-MCPD. A single glycidyl ester with a molar mass of approximately 270 was created using the UNIFAC group contribution method. The conventional short path evaporator was modeled as a flash box with heat input and short path stripping was modeled as an SCDS distillation column with between two and three stages with feed on the top stage. Simulations were run at specified operating pressures of 0.001 Torr and 0.01 Torr. The operating temperatures in each unit operation were then adjusted in order to decrease either the GE or the free 3-MCPD content to a certain concentration. FIG. 2 shows oil losses versus number of stages at operating conditions required to achieve 100 ppb GE in the bottoms stream. FIG. 3 shows oil losses versus number of stages at operating conditions required to achieve 50 ppb free 3-MCPD in the bottoms product stream. Both figures clearly demonstrate that product yield is significantly improved with increasing number of stages for a given degree of contaminant removal. This demonstrates that short path stripping reduces the oil losses compared to conventional short path evaporators.

What is claimed is:

1. A method for removing contaminants, including glycidyl fatty acid esters (GEs) and/or 3-monochloropropane diol (3-MCPDs) esters, from edible fats and oils, the method comprising:
   providing a vertical short path stripper (SPS) configured to pre-heat an edible oil to a temperature between about 100° C. and about 200° C., wherein the SPS comprises:
   (a) a heat exchange fluid entry point, a heat exchange fluid exit point and a heat exchange fluid circuit in fluid communication between the heat exchange fluid entry point and the heat exchange fluid exit point;
   (b) an alternating series of tubular heating jackets and discs thermally coupled to the heat exchange fluid circuit, wherein the jackets and discs are vertically and spatially separated from each other; and
   (c) an internal condenser having a surface and extending vertically through the body of the SPS;
   introducing edible oil that includes contaminants to a top of the SPS, thereby creating a downward flowing edible oil stream in the SPS;
   supplying a heat exchange fluid at about 150° C. to about 250° C. to the heat exchange fluid entry point and causing the heat exchange fluid to flow through the heat exchange fluid circuit, thereby heating the jackets and making the series of jackets relatively warm and the discs relatively cool;
   cooling the internal condenser to a temperature lower than a temperature of the series of jackets;
   flowing the edible oil progressively through the alternating series of relatively warm jackets and relatively cool discs, thereby creating a free falling film on internal surfaces of the jackets, which film is continuously refreshed by falling from one of the jackets onto a next lower disc surface and there reformed;
   establishing an at least partial vacuum of about 0.01 to about 0.1 Torr within the SPS, thereby providing a first driving force to separate the contaminants from the downward flowing edible oil stream;
   wherein the first driving force and the flowing of the edible oil progressively through the alternating series of relatively warm jackets and relatively cool discs creates a heated vapor comprising contaminants from the downward flowing edible oil stream;

causing the heated vapor to travel, as a vapor, a predetermined distance, no greater than about one mean free path (MFP), before contacting the internal condenser;

condensing the vapor onto the surface of the internal condenser to form a condensate;

forming a waste stream of the condensate;

removing the waste stream by causing the condensate to drip down as a film on the surface of the inner condenser and leave the SPS as a distilled contaminant;

causing the edible oil, depleted of contaminant, to exit the SPS through a separate connection from the condensate; and cooling the edible oil that exits the SPS;

wherein the cooling the internal condenser provides a second driving force to condense contaminants remaining in the edible oil.

2. The method according to claim 1 wherein the edible oil is a refined oil from a deodorizer, the refined oil having a residual concentration of free fatty acid (FFAs) that is about 1% or less by weight.

3. The method according to claim 2 wherein the edible oil that exits the SPS has a residual concentration of free fatty acid (FFAs) no more than about 0.5% by weight.

4. The method according to claim 1 wherein introducing the edible oil comprises introducing the edible oil at about 140° C. to about 155° C.

5. The method according to claim 1 wherein the heat exchange fluid is supplied at about 170° C. to about 210° C.

6. The method according to claim 1, further comprising deodorizing the edible oil while simultaneously removing the GEs and 3-MCPDs.

7. The method according to claim 1, wherein the edible oil that exits the SPS comprises less than about 500 PPB of the GEs.

8. The method according to claim 1, wherein the edible oil that exits the SPS comprises less than about 200 PPB of the GEs.

9. The method according to claim 1, wherein the edible oil that exits the SPS comprises less than about 500 PPB of the 3-MCPDs.

10. The method according to claim 1, wherein the edible oil that exits the SPS comprises less than about 200 PPB of the 3-MCPDs.

11. The method according to claim 1, wherein the edible oil that exits the SPS comprises a deodorized oil having at most about 0.5% by weight FFAs.

12. The method according to claim 1, where the yield of the edible oil that exits the SPS is at least about 90%.

13. The method according to claim 1, where the yield of the edible oil that exits the SPS is at least about 95%.

14. The method according to claim 1, wherein the edible oil that exits the SPS comprises no more than about 500 PPB of contaminants.

15. The method according to claim 1, wherein:
the heat exchange fluid is supplied at a temperature no greater than about 200° C.; and
the edible oil that exits the SPS comprises no more than about 500 PPB.

16. The method according to claim 1, wherein:
the heat exchange fluid is supplied at a temperature no greater than about 150° C.; and
the edible oil that exits the SPS comprises no more than about 500 PPB of contaminants.

17. The method according to claim 1, whereby deodorization occurs along with the removal of GEs in a single pass continuous operation.

18. The method according to claim 1, whereby deodorization occurs along with the removal of 3-MCPDs in a single pass continuous operation.

19. The method according to claim 1, wherein the content of MAGs and DAGs with molecular weight of about 700 is reduced by about 70% or more in the edible oil.

20. The method according to claim 1, where at least about 50% of any antioxidants in the edible oil introduced to the top of the SPS, including tocopherols and sterols, remain in the edible oil that exits the SPS.

* * * * *

UNITED STATES PATENT AND TRADEMARK OFFICE
CERTIFICATE OF CORRECTION

| | | |
|---|---|---|
| PATENT NO. | : 11,447,718 B2 | Page 1 of 1 |
| APPLICATION NO. | : 16/881431 | |
| DATED | : September 20, 2022 | |
| INVENTOR(S) | : Perry Alasti | |

It is certified that error appears in the above-identified patent and that said Letters Patent is hereby corrected as shown below:

In the Claims

In Claim 15, Column 10, Line 19, after "about 500 PPB", insert --of contaminants--.

Signed and Sealed this
First Day of November, 2022

Katherine Kelly Vidal
*Director of the United States Patent and Trademark Office*